United States Patent
Baracaldo Angel et al.

(10) Patent No.: US 10,810,510 B2
(45) Date of Patent: Oct. 20, 2020

(54) CONVERSATION AND CONTEXT AWARE FRAUD AND ABUSE PREVENTION AGENT

(71) Applicant: INTERNATIONAL BUSINESS MACHINES CORPORATION, Armonk, NY (US)

(72) Inventors: Nathalie Baracaldo Angel, San Jose, CA (US); Pawan R. Chowdhary, San Jose, CA (US); Heiko H. Ludwig, San Francisco, CA (US); Robert J. Moore, San Jose, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 15/436,357

(22) Filed: Feb. 17, 2017

(65) Prior Publication Data
US 2018/0240028 A1    Aug. 23, 2018

(51) Int. Cl.
| | |
|---|---|
| G06N 20/00 | (2019.01) |
| H04M 3/533 | (2006.01) |
| G10L 25/63 | (2013.01) |
| H04M 3/22 | (2006.01) |
| H04L 29/06 | (2006.01) |

(52) U.S. Cl.
CPC ......... G06N 20/00 (2019.01); H04L 63/1408 (2013.01); H04M 3/2281 (2013.01); G10L 25/63 (2013.01); H04M 3/533 (2013.01); H04M 2203/6027 (2013.01)

(58) Field of Classification Search
CPC . G06N 20/00; H04L 63/1408; H04M 3/2281; H04M 3/533; H04M 2203/6027; G10L 25/63
See application file for complete search history.

(56) References Cited

U.S. PATENT DOCUMENTS

| | | |
|---|---|---|
| 6,246,672 B1 | 6/2001 | Lumelsky |
| 6,604,077 B2 | 8/2003 | Daragosh et al. |
| 6,611,537 B1 | 8/2003 | Edens et al. |

(Continued)

FOREIGN PATENT DOCUMENTS

| | | |
|---|---|---|
| CN | 102571487 A | 7/2012 |
| CN | 105187367 | 12/2015 |
| IN | 201641021969 | 7/2016 |

OTHER PUBLICATIONS

List of IBM Patents or Patent Applications Treated As Related.
(Continued)

Primary Examiner — Eric Nilsson
Assistant Examiner — Ahsif A. Sheikh
(74) Attorney, Agent, or Firm — Sherman IP LLP; Kenneth L. Sherman; Hemavathy Perumal

(57) ABSTRACT

One embodiment provides a method comprising intercepting a voice communication, collecting multi-sensory inputs associated with the voice communication, and determining an overall risk assessment metric for the voice communication based on the multi-sensory inputs and learned signatures. The multi-sensory inputs are indicative of content of the voice communication and one or more contextual factors associated with a target of the voice communication. The overall risk assessment metric indicates a likelihood the voice communication is a scam.

20 Claims, 9 Drawing Sheets

(56) References Cited

U.S. PATENT DOCUMENTS

| | | | |
|---|---|---|---|
| 6,700,963 | B1 | 3/2004 | Jordan |
| 7,242,752 | B2 | 7/2007 | Chiu |
| 7,382,867 | B2 | 6/2008 | Smith, Sr. et al. |
| 7,540,021 | B2 | 5/2009 | Page |
| 7,904,518 | B2 | 3/2011 | Marino et al. |
| 7,933,399 | B2 | 4/2011 | Knott et al. |
| 8,292,433 | B2 | 10/2012 | Vertegaal et al. |
| 8,340,975 | B1 | 12/2012 | Rosenberger et al. |
| 8,411,833 | B2 | 4/2013 | Dolan et al. |
| 8,537,996 | B2 | 9/2013 | Takeyama et al. |
| 8,565,396 | B1 | 10/2013 | Oliver et al. |
| 8,761,353 | B1* | 6/2014 | Apple .......... H04M 15/08 379/201.01 |
| 8,769,671 | B2 | 7/2014 | Shraim et al. |
| 8,863,244 | B2 | 10/2014 | Bono et al. |
| 8,925,095 | B2 | 12/2014 | Herz et al. |
| 9,014,359 | B1 | 4/2015 | H.L. et al. |
| 9,075,977 | B2 | 7/2015 | Gross |
| 9,116,877 | B2 | 8/2015 | Chandramouli et al. |
| 9,245,115 | B1 | 1/2016 | Jakobsson |
| 9,262,610 | B2 | 2/2016 | Hudack et al. |
| 9,300,790 | B2* | 3/2016 | Gainsboro .......... H04M 3/2281 |
| 9,332,025 | B1 | 5/2016 | Watson et al. |
| 9,357,362 | B2 | 5/2016 | Jin et al. |
| 9,553,985 | B2 | 1/2017 | Cohen et al. |
| 9,633,674 | B2 | 4/2017 | Sinha |
| 9,665,703 | B2 | 5/2017 | Turgeman et al. |
| 9,667,994 | B2 | 5/2017 | Almeida |
| 9,690,915 | B2 | 6/2017 | Turgeman et al. |
| 9,696,813 | B2 | 7/2017 | Chui |
| 9,712,526 | B2 | 7/2017 | Headley et al. |
| 9,729,727 | B1 | 8/2017 | Zhang et al. |
| 9,843,668 | B2* | 12/2017 | Hodge .......... H04M 1/67 |
| 10,277,981 | B1 | 4/2019 | Frank et al. |
| 10,299,061 | B1 | 5/2019 | Sheen |
| 10,461,710 | B1 | 10/2019 | Charlton et al. |
| 2003/0187659 | A1 | 10/2003 | Cho et al. |
| 2009/0055193 | A1 | 2/2009 | Maislos et al. |
| 2010/0229245 | A1 | 9/2010 | Singhal |
| 2011/0182283 | A1 | 7/2011 | Van Buren et al. |
| 2012/0254333 | A1 | 10/2012 | Chandramouli et al. |
| 2012/0294435 | A1* | 11/2012 | Cox .......... H04M 15/06 379/201.02 |
| 2013/0198298 | A1 | 8/2013 | Li et al. |
| 2013/0339105 | A1 | 12/2013 | Russell et al. |
| 2014/0122618 | A1 | 5/2014 | Duan |
| 2014/0192965 | A1 | 7/2014 | Almeida et al. |
| 2014/0237599 | A1 | 8/2014 | Gertner et al. |
| 2014/0280933 | A1 | 9/2014 | Oswald et al. |
| 2014/0297282 | A1 | 10/2014 | Peters et al. |
| 2014/0370838 | A1 | 12/2014 | Kim et al. |
| 2015/0039319 | A1 | 2/2015 | Mei et al. |
| 2015/0096020 | A1 | 4/2015 | Adams et al. |
| 2015/0156214 | A1 | 6/2015 | Kaminsky et al. |
| 2015/0195403 | A1 | 7/2015 | Goulet et al. |
| 2015/0288791 | A1* | 10/2015 | Weiss .......... H04M 3/436 379/189 |
| 2016/0005029 | A1 | 1/2016 | Ivey et al. |
| 2016/0046023 | A1 | 2/2016 | Nagendran et al. |
| 2016/0063218 | A1 | 3/2016 | Nachenberg et al. |
| 2016/0065528 | A1 | 3/2016 | Weskler et al. |
| 2016/0142398 | A1 | 5/2016 | Lin |
| 2016/0147992 | A1 | 5/2016 | Zhao et al. |
| 2016/0217790 | A1 | 7/2016 | Sharlfi et al. |
| 2016/0309281 | A1 | 10/2016 | Lee |
| 2016/0316057 | A1 | 10/2016 | Korn |
| 2017/0134574 | A1* | 5/2017 | Winkler .......... H04M 3/4211 |
| 2017/0180284 | A1 | 6/2017 | Smullen et al. |
| 2017/0180899 | A1 | 6/2017 | Proctor, Jr. et al. |
| 2017/0236514 | A1 | 8/2017 | Nelson |
| 2017/0251328 | A1 | 8/2017 | Klein |
| 2017/0311341 | A1 | 10/2017 | Patil et al. |
| 2017/0344532 | A1 | 11/2017 | Zhou et al. |
| 2018/0146370 | A1 | 5/2018 | Krishnaswamy et al. |
| 2018/0270290 | A1 | 9/2018 | Sinha et al. |

OTHER PUBLICATIONS

List of IBM Patents of Applications Treated as Related.

Pindrop Security, "The State of Phone Fraud 2014-2015 A Global, Cross-industry Threat", Sep. 8, 2016, pp. 1-16, White Paper, Pindropsecurity.com, United States Anonymous, "Security Control in Mobile Messaging Services", Oct. 23, 2014, pp. 1-2, IP.com, United States.

Linux Defenders, et al,, "Method of Advanced Span Detection and Classification", Mar. 23, 2009, ipCapital Group, Inc., pp. 1-6, IP.com, United States.

International Business Machines Corporation (IBM), ""Unstable Code" Higher Level Compiler Messages Classification", Aug. 26, 2008, IP.com, United States.

Andriesse, D. et al., "Highly Resilient Peer-to-Peer Botnets Are Here: An Analysis of Gameover Zeus", Proceedings of the 2013 8th International Conference on Malicious and Unwanted Software: "The Americas" (MALWARE), Oct. 22-24, 2013, pp. 1-8, IEEE, United States.

Kale, A.R. et al., "An Advanced Hybrid Peer-to-Peer Botnet", International Journal of Wireless Communication, Mar. 15, 2012, pp, 15-19, vol. 2, Issue 1, Bioinfo Publications, United States.

Gruber, M. et al., "Voice Calls for Free: How the Black Market Establishes Free Phone Calls- Trapped and Uncovered by a VoIP Honeynet", Proceedings of the 2013 11th Annual Conference on Privacy, Security and Trust (PST), Jul. 10-12, 2013, pp. 205-212, IEEE, United States.

Tero, P. et al., "Cleverbot Data for Machine Learning", Jan. 2016, pp. 1-17, Existor.com [http://www.existor.com/en/ml-cleverbot-data-for-machine-learning.html], United Kingdom.

List of IBM Patents or Patent Applications Treated As Related; Angel, Nathalie Baracaldo, U.S. Appl. No. 16/455,593, filed Jun. 27, 2019.

List of IBM Patents or Patent Applications Treated As Related; Angel, Nathalie Baracaldo, U.S. Appl. No. 16/592,655, filed Oct. 3, 2019.

List of IBM Patents or Patent Applications Treated as related; Angel, Baracaldo, N., U.S. Appl. No. 16/917,610, filed Jun. 30, 2020.

* cited by examiner

| | Predicted Classification Class | CF | May remove features with low CF by ignoring these features | Function $f_i$ | Output Description of $f_i$ | Output of $f_i$ | Weight $w_i$ | Risk |
|---|---|---|---|---|---|---|---|---|
| Caller identity ($G_1$): | | | | $f_1(G_1) =$ Entropy(C) Further investigation required if learned models output different predicted classification classes | If $f_1(G_1) = 0$, further investigation not required (i.e., all learned models output the same predicted classification class). If $f_1(G_1) = 1$, further investigation required. | 1 | 0.4 | 0.88 |
| <Caller_identification_based_on_content, CF> | grandson | 0.9 | | | | | | |
| <Conversation_signature_member, CF> | unknown | 0.9 | | | | | | |
| <Caller_identity_based_on_voice, CF> | unknown | 0.9 | | | | | | |
| Scam type ($G_2$): | | | | A learned model is trained to correlate features (e.g., using Bayesian networks) | If Scam_type != none and CF > τ, return CF; otherwise, return 0 | 0.8 | 0.5 | |
| <Scam_type, CF> | grandpa | 0.8 | | | | | | |
| <Social_eng_tactic, CF> | pressure, rushing | 0.8 | | | | | | |
| <Emotion_type_adversary, CF> | scared | 0.8 | | | | | | |
| <List-of-suspicious-keywords, list_CF> | payment, money transfer | 0.9 | | | | | | |
| <Emotion_type_target, CF> | worried | 0.4 | | | | | | |
| Call purpose ($G_3$): | | | | | | 1 | 0.5 | |
| <Call_purpose, CF> | accident | 1 | | | | | | |
| Context ($G_4$): | | | | | | 0.8 | 0.1 | |
| <money_sensor, CF> | opened wallet | 0.1 | | | | | | |
| <use_device, CF> | no action | 1 | | | | | | |
| <in_company, CF> | alone | 0.8 | | | | | | |

CONVERSATION AND CONTEXT AWARE FRAUD AND ABUSE PREVENTION AGENT

The present invention generally relates to fraud and abuse prevention, and more particularly, to a conversation and context aware fraud and abuse prevention agent.

BACKGROUND

Phone scams are common examples of financial/economic abuse. Phone scams are fraud crimes initiated by perpetrators via phone calls or voice messages. Victims of phone scams may be affected financially and/or emotionally. For example, a victim of a phone scam is often tricked into providing money, private information, and/or remote access to one or more of their devices to a perpetrator of the phone scam over the phone. In recent years, hundreds of millions of dollars in financial losses are attributable to phone scams. Phone scams may affect any demographic (e.g., elderly, teenagers, other vulnerable populations, etc.) and any geographic location (e.g., countries, etc.).

SUMMARY

One embodiment provides a method comprising intercepting a voice communication, collecting multi-sensory inputs associated with the voice communication, and determining an overall risk assessment metric for the voice communication based on the multi-sensory inputs and learned signatures. The multi-sensory inputs are indicative of content of the voice communication and one or more contextual factors associated with a target of the voice communication. The overall risk assessment metric indicates a likelihood the voice communication is a scam.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 6 illustrates an example process for determining an overall risk assessment metric for an intercepted phone call/voice message, in accordance with an embodiment of the invention;

Figure 1:
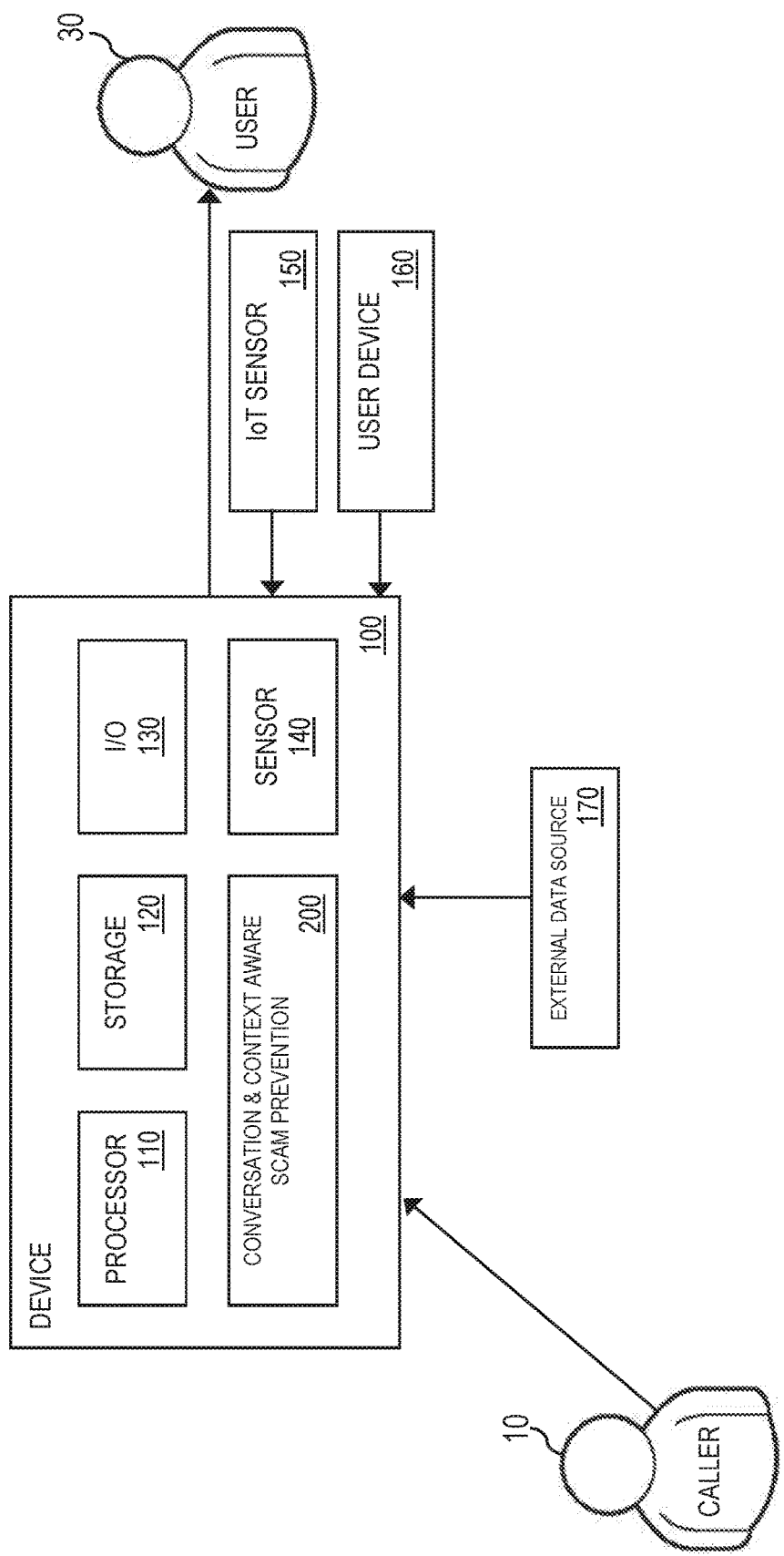
FIG. 1 illustrates an example computer architecture for continuous fraud and abuse prevention, in accordance with an embodiment of the invention.

The detailed description explains the preferred embodiments of the invention, together with advantages and features, by way of example with reference to the drawings.

DETAILED DESCRIPTION

The present invention generally relates to fraud and abuse prevention, and more particularly, to a conversation and context aware fraud and abuse prevention agent. One embodiment provides a method comprising intercepting a voice communication, collecting multi-sensory inputs associated with the voice communication, and determining an overall risk assessment metric for the voice communication based on the multi-sensory inputs and learned signatures. The multi-sensory inputs are indicative of content of the voice communication and one or more contextual factors associated with a target of the voice communication. The overall risk assessment metric indicates a likelihood the voice communication is a scam.

For expository purposes, the term "user" as used herein refers to a target of a phone scam. The terms "user", "receiver", and "target" may be used interchangeably in the specification.

For expository purposes, the term "caller" as used herein refers to a perpetrator of a phone scam. The terms "caller", "scammer", "perpetrator", and "adversary" may be used interchangeably in the specification.

Phone scams are difficult to prevent. Existing methodologies for scam prevention typically involve filtering phone numbers of incoming phone calls based on a collection of phone numbers flagged as suspicious (i.e., blacklisted). Specifically, existing methodologies compare a phone number of an incoming phone call against phone numbers that are blacklisted, and block the phone call if the phone number matches a blacklisted phone number. Existing methodologies, however, do not account for tactics scammers may employ to evade detection, such as spoofing phone numbers, frequently changing spoofed phone numbers, and using spoofed phone numbers that correspond to a geographical area of a targeted victim (e.g., area code of a spoofed phone number matches a zip code of a targeted victim). Further, existing methodologies require a minimum number of people to report a phone number as suspicious before the phone number can be added to the phone bank. Therefore, some who receive phone calls from a phone number not included in the phone bank may fall victim to a scammer before the phone number is added to the phone bank. Existing methodologies do not analyze content and context of a phone call or a voice message to identify attributes commonly associated with phishing, phone scams, and telemarketing.

One embodiment provides a continuous fraud and abuse prevention methodology that considers multiple inputs and determines, based on the multiple inputs, a risk assessment metric and a set of actions to take to prevent a user from fraud and abuse.

One embodiment provides a conversation and context aware fraud and abuse prevention agent that examines common social engineering tactics that scammers may employ. The agent utilizes a risk computation mechanism that considers multiple inputs, including external information such as sensor information captured by Internet of Things (IoT) sensor devices, bank account information, etc. The agent supports real-time intervention by automatically providing a set of actions to react to suspicious scams and protect users. The agent also supports analysis of voice messages and content of conversations to detect attributes that indicate phishing, scams, telemarketing, etc. Further, the agent may link voice messages to outgoing phone calls.

FIG. 1 illustrates an example computer architecture 50 for continuous fraud and abuse prevention, in accordance with an embodiment of the invention. The computer architecture 50 comprises an electronic device 100 including computation resources, such as one or more processor units 110 and one or more storage units 120. One or more applications may execute/operate on the device 100 utilizing the computation resources of the device 100. In one embodiment, the applications include, but are not limited to, a conversation and context aware fraud and abuse prevention system 200. As described in detail later herein, the system 200 is configured to intercept a phone call/voice message targeting a user 30 from a caller 10, perform a conversation and context analysis, determine an overall risk assessment metric indicative of likelihood of the phone call/voice message being a scam, and determine a recommendation and an intervention, if applicable, based on the risk assessment metric.

In one embodiment, the system 200 may be used to screen live incoming phone calls, voice messages, and live outgoing phone calls responding to prior voice messages classified as scams. For example, the system 200 may screen each of the following: (1) an incoming phone call to the user 30 from the caller 10, (2) a voice message for the user 30 from the caller 10, and (3) an outgoing phone call to the caller 10 from the user 30, the outgoing phone call responding to a prior voice message from the caller 10 that was classified as scam (i.e., the outgoing phone call is linked to the prior voice message).

The device 100 may be any type of electronic device, such as, but not limited to, a mobile device (e.g., a smart phone, a laptop, a tablet, etc.), a digital telephone, a server coupled to a local network, a monitoring and action (MA) device, etc. A MA device is configured to continuously listen to, and initiate recordings of, surrounding noises and conversations of the user 30. A MA device may be integrated in or coupled to an object worn/carried by the user 30, such as a smartphone, a watch, a purse, a wallet, a doll, a baby monitor, a walking cane, etc.

In one embodiment, the device 100 comprises one or more input/output (I/O) modules 130 integrated in or coupled to the device 100, such as a keyboard, a keypad, a touch interface, a display screen, etc.

In one embodiment, the device 100 comprises one or more sensor modules 140 integrated in or coupled to the device 100, such as a microphone, GPS, etc. The one or more sensor modules 140 may be utilized to capture conversations of the user 30 and/or contextual data. For example, during a phone call between the user 30 and the caller 10, the system 200 may utilize a microphone of the device 100 to record a conversation between the caller 10 and the user 30, including the voices of the caller 10 and the user 30. The system 200 may perform a sound/voice analysis on the voice recordings of the caller 10 and the user 30, and a content analysis on the conversation recorded.

In one embodiment, the device 100 is configured to exchange data with one or more external IoT sensor devices 150 over a connection (e.g., a wireless connection such as a WiFi connection or a cellular data connection, a wired connection, or a combination of the two). The one or more IoT sensor devices 150 may be utilized to capture conversations of the user 30 and/or contextual data. In one embodiment, the one or more IoT sensor devices 150 may include, but are not limited to, the following: (1) a MA device, (2) one or more wearable sensor devices worn/carried by the user 30, and (3) one or more other sensor devices deployed in an object of the user 30 (e.g., a money holder, a user device 160, etc.) to detect when a financial related activity is performed.

For example, one or more sensor devices deployed in a money holder of the user 30 (e.g., a wallet, a purse, or another place where money and valuables are stored) may detect when the money holder is opened and cash/a credit card is taken out. As another example, one or more sensor devices deployed in a user device 160 of the user 30 (e.g., a computer, a smartphone, etc.) may detect when the user device 160 is utilized to perform a financial transaction.

As stated above, an MA device is configured to continuously listen to, and initiate recordings of, surrounding noises and conversations of the user 30. The MA device may be integrated in or coupled to an object worn/carried by the user 30, such as a smartphone, a watch, a purse, a wallet, a walking cane, a doll, etc. The MA device may have GPS functionality to track a location of the user 30.

Examples of wearable sensor devices include, but are not limited to, corporal sensor devices that monitor body temperature, sweat, heartbeat, blood pressure, and other biometric measures. As described in detail later herein, the system 200 may analyze information from the one or more IoT sensor devices 150 in determining an overall risk assessment metric for an intercepted phone call/voice message.

In one embodiment, the device 100 is configured to exchange data with one or more user devices 160 over a connection (e.g., a wireless connection such as a WiFi connection or a cellular data connection, a wired connection, or a combination of the two). The user device 160 may be any type of electronic device, such as, but not limited to, a mobile device (e.g., a smart phone, a laptop, a tablet, etc.), a desktop computer, etc. The user 30 may utilize the user device 160 to initiate an electronic money transfer, make an electronic payment, make a purchase, etc. As described in detail later herein, the system 200 may analyze information from the one or more user devices 160 in determining an overall risk assessment metric for an intercepted phone call/voice message.

In one embodiment, the device 100 is configured to exchange data with one or more external data sources 170 over a connection (e.g., a wireless connection such as a WiFi connection or a cellular data connection, a wired connection, or a combination of the two). The one or more external data sources 170 may maintain information relevant to the user 30 such as, but not limited to, account information indicative of recent activity with a bank account/credit card of the user 30 (e.g., money transfers, credit card transactions, etc.), social media information indicative of activity of the user 30 (e.g., comments/reviews posted, etc.) on one or more social media platforms (e.g., Facebook®, Twitter®, etc.), etc. As described in detail later herein, the system 200 may analyze information from the one or more external data sources 170 in determining an overall risk assessment metric for an intercepted phone call/voice message.

Figure 2:
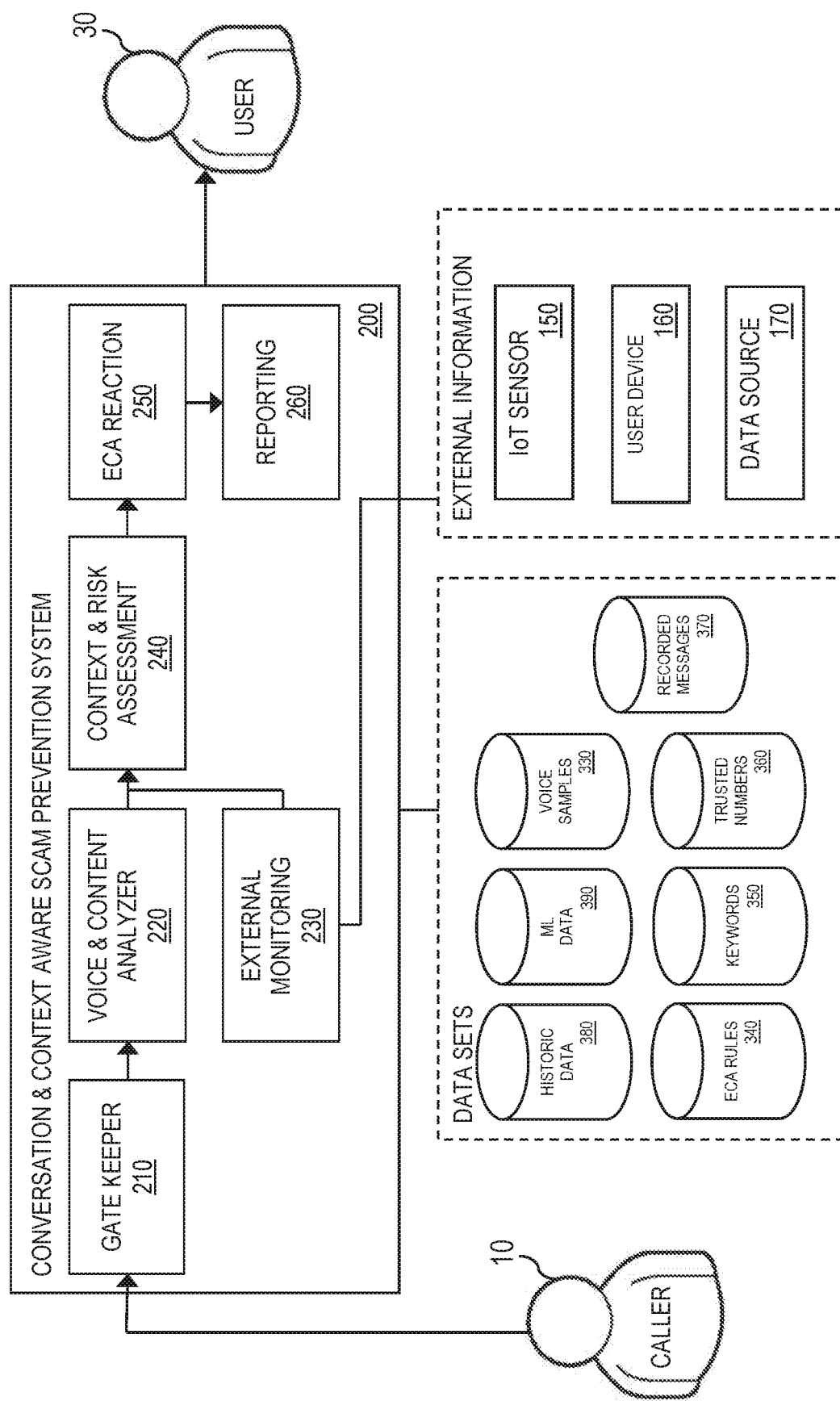
FIG. 2 illustrates an example conversation and context aware fraud and abuse prevention system in detail, in accordance with an embodiment of the invention.

FIG. 2 illustrates an example conversation and context aware fraud and abuse prevention system 200 in detail, in accordance with an embodiment of the invention. The system 200 comprises, but is not limited to, the following components: (1) a gate keeper 210, (2) a voice and content analyzer 220, (3) an external monitoring unit 230, (4) a context and risk assessment unit 240, (5) an event condition action (ECA) reaction unit 250, and (6) a reporting unit 260.

One or more components of the system 200 may utilize one or more data sets such as, but not limited to, the following: (1) a first data set 380 maintaining historic data including sensor readings from one or more IoT sensor devices 150, (2) a second data set 390 maintaining known scam information or training data, including signatures of known scams, (3) a third data set 330 maintaining voice samples of trusted persons (i.e., individuals who the user 30 trusts, such as a family member, etc.), (4) a fourth data set 340 maintaining a set of event condition action (ECA) rules, (5) a fifth data set 350 maintaining suspicious keywords commonly associated with social engineering tactics scammers may employ, (6) a sixth data set 360 maintaining trusted phone numbers (i.e., phone numbers of trusted persons), and (7) a seventh data set 370 maintaining recordings of intercepted phone calls/voice messages and corresponding risk assessment results. Each data set may be maintained locally on the device 100 or remotely (e.g., on a remote server).

The gate keeper unit 210 is configured to intercept each of the following: (1) an incoming phone call to the user 30 from the caller 10, (2) a voice message for the user 30 from the caller 10, and (3) an outgoing phone call to the caller 10 from the user 30, the outgoing phone call responding to a prior voice message from the caller 10 that was classified as scam (i.e., the outgoing phone call is linked to the prior voice message).

The voice and content analyzer 220 is configured to analyze content of a conversation/speech in an intercepted phone call/voice message. As described in detail later herein, in one embodiment, the analyzer 220 obtains a recording of the conversation/speech from a MA device, invokes/applies a speech-to-text service/process to transcribe the conversation/speech, and applies one or more text-based learned models to the resulting transcript to determine content of the phone call/voice message. One or more classification results from the text-based learned models applied may be forwarded to the context and risk assessment unit 240. The content analyzer 220 is also configured to analyze voices/sounds in the phone call/voice message. In one embodiment, the analyzer 220 applies one or more sound-based learned models to voice recordings and/or background noises in the phone call/voice message to determine voices/sounds in the phone call/voice message. One or more classification results from the sound-based learned models applied may be forwarded to the context and risk assessment unit 240.

In one embodiment, the voice and content analyzer 220 is configured to determine an entity type of the caller 10. Examples of different entity types include, but are not limited to, a human, a recorded script, a robot, etc.

In one embodiment, the voice and content analyzer 220 is configured to determine a stated or implied identity of the caller 10 based on an explicit or implicit introduction made by caller 10. An explicit introduction involves the caller 10 explicitly introducing himself/herself to the user 30 (e.g., the caller 10 saying "Hi, this is John Doe"). An implicit introduction involves the caller 10 implicitly introducing himself/herself to the user 30 (e.g., the caller 10 saying "Hi grandma", implying that the caller 10 is a grandchild of the user 30).

In one embodiment, the voice and content analyzer 220 is configured to perform a voice authentication on a voice of the caller 10 ("caller's voice"). Specifically, the content analyzer 220 applies one or more voice recognition techniques to the caller's voice to authenticate the stated or implied identity of the caller 10. The content analyzer 220 may utilize voice samples of trusted persons maintained in the data set 330 for voice authentication. For example, if the caller 10 identifies himself/herself as a grandchild of the user 30, the content analyzer 220 may compare the caller's voice against a voice sample of the grandchild to verify that the caller 10 is the grandchild. Voice authentication helps deter scams involving scammers who spoof a phone number of a trusted person and/or impersonate the trusted person.

In one embodiment, the voice and content analyzer 220 is configured to perform a voice stress analysis on the caller's voice to determine stress levels and/or loudness levels of the caller's voice (e.g., how loud the caller 10 is speaking). The content analyzer 220 may also perform a voice stress analysis on a voice of the user 30 ("the user's voice) to determine stress levels and/or loudness levels of the user's voice (e.g., pitch of the user's voice).

In one embodiment, the voice and content analyzer 220 is configured to perform an emotional distress analysis on the caller's voice to determine tone of the caller's voice and content of a speech of the caller 10 ("caller's speech"). The content analyzer 220 may also perform an emotional distress analysis on the user's voice to determine tone of the user's voice (e.g., fear, etc.).

In one embodiment, the voice and content analyzer 220 is configured to detect one or more conversation content cues in an intercepted phone call/voice message, wherein each conversation content cue indicates a social engineering tactic (i.e., speaking strategy) scammers may employ. Examples of conversation content cues include, but are not limited to, the caller 10 reciting well-known scam phrases (e.g., the caller 10 mentioning that he/she is part of technical support), the caller 10 requesting the user 30 not to call or inform anyone else, the caller 10 rushing/pressuring the user 30 to perform an action (e.g., the caller 10 urging the user 30 to hurry up and accept an offer or miss his/her chance as the offer is a once in a life-time opportunity), the caller 10 threatening the user 30 (e.g., alleging the user 30 will receive a citation or go to jail as the user 30 is behind in taxes, alleging the user 30 missed jury duty, alleging the user 30 is in jeopardy of being deported, etc.), the caller 10 alleging an emergency situation has occurred (e.g., the caller 10 impersonating a family member and alleging that he/she is in trouble, the caller 10 alleging a family member is in trouble, etc.), or the caller 10 directing the user 30 to perform a money transfer (e.g., a PayPal® transfer, a green dot card transfer, etc.), provide remote access to a user device 160 of the user 30, or provide personal information (e.g., a social security number, a credit card number, a bank account number, etc.).

In one embodiment, the voice and content analyzer 220 is configured to perform an analysis on background noises in an intercepted phone call/voice message to detect noises/sounds commonly associated with environments utilized by scammers. For example, as scammers typically call from call centers, the content analyzer 220 may analyze background noises in the phone call/voice message to detect noises/sounds commonly associated with data centers, such as sounds from a boiler room.

Some social engineering tactics require the user 30 to carry out external actions that are suspicious, such as the user 30 using his/her user device 160 (e.g., a computer, tablet, smartphone, etc.) to complete a financial transaction (e.g., making a money transfer, making a payment via PayPal® or other payment mechanism, etc.), the user 30 looking up his/her personal information (e.g., bank account number, credit card number, etc.), the user 30 providing the caller 10 remote access to his/her user device 160. The system 200 utilizes sensor information captured by IoT sensor devices 150, such as sensor devices deployed in a money holder of the user 30 (e.g., a wallet, a purse, or another place where money and valuables are stored) for detecting when the money holder is opened and cash/a credit card is taken out, sensors for detecting whether the user 30 is alone or with one or more companions (e.g., video cameras, heat sensors, and/or carbon dioxide ($CO_2$) sensors arranged in the home/house of the user 30), corporal sensors for monitoring body temperature, sweat, heartbeat, blood pressure, and other biometric measures for determining stress levels of the user 30, etc.

The external monitoring unit 230 is configured to collect external information comprising sensor information and/or inputs from one or more sensor devices 150, one or more user devices 160, and/or one or more external data sources 170. The external information collected may include, but are not limited to, the following: device usage information indicative of usage of one or more user devices 160 by the user 30, social media information indicative of activity of the user 30 (e.g., comments/reviews posted, etc.) on one or more social media platforms (e.g., Facebook®, Twitter®, etc.), account information indicative of recent activity associated with a bank account or a credit card of the user 30 (e.g., money transfers, credit card transactions), one or more IoT sensor readings, etc. Examples of IoT sensor readings include, but are not limited to, the following: a location of the user 30 from a GPS, weather/temperature information for the location of the user 30, video information capturing the user 30 and his/her surroundings, financial activity information indicative of recent financial related activity associated with the user 30 (e.g., the user 30 opening a wallet to take out cash/a credit card, the user 30 performing a financial transaction via a user device 160, etc.), biometric measures from IoT corporal sensors worn/carried by the user 30, such as body temperature, sweat, heartbeat, blood pressure, etc.

The external monitoring unit 230 is configured to analyze context of an intercepted phone call/voice message based on external information collected for the phone call/voice message. In one embodiment, the monitoring unit 220 applies one or more sensor-based and/or input-based learned models to the external information collected to determine context of the phone call/voice message. One or more classification results from the sensor-based and/or input-based learned models applied may be forwarded to the context and risk assessment unit 240.

The context and risk assessment unit 240 is configured to: (1) collect multi-sensory inputs for an intercepted phone call/voice message by aggregating data from the voice and context analyzer 220 and the external monitoring unit 230, (2) perform context extraction to integrate and correlate the inputs and call history, if available, and (3) perform risk assessment to determine an overall risk assessment metric for the phone call/voice message based on multi-sensory signature comparison. The multi-sensory signature comparison is based on the multi-sensory inputs and previously learned signatures (e.g., signatures of known scams, conversation signatures of trusted persons, etc.). In one embodiment, the assessment unit 240 may apply any type of aggregation technique to aggregate data, such as, but not limited to, a Bayesian network, a linear combination of classifier results, rule-based combination of inputs, neural network, etc.

The ECA reaction unit 250 is configured to: (1) receive a risk assessment metric for an intercepted phone call/voice message from the context and risk assessment unit 240, and (2) determine whether a recommendation/feedback and/or an intervention is required based on the risk assessment metric and a set of ECA rules maintained in a dataset 340. Each ECA rule specifies an event, a condition to satisfy if the event occurs, and a set of actions to take if the condition is satisfied (i.e., for performing an intervention).

In one embodiment, the ECA reaction unit 250 determines the phone call/voice message requires an intervention if the risk assessment metric exceeds a pre-determined threshold (i.e., the risk assessment metric is too high). If the phone call/voice message requires an intervention, the ECA reaction unit 250 generates a set of actions for performing the intervention.

For example, if the risk assessment metric is low (i.e., the phone call/voice message is low risk), the ECA reaction unit 250 determines no intervention is required. The phone call may continue or the user 30 may respond to the voice message by placing an outgoing phone call to the caller 10.

For example, if the risk assessment metric is medium (i.e., the phone call/voice message is medium risk), the ECA reaction unit 250 provides feedback to the user 10 indicating as such. The ECA reaction unit 250 may provide feedback to the user 30 via one or more sensor devices 150 (e.g., a MA device).

For example, if the risk assessment metric is high (i.e., the phone call/voice message is high risk), the ECA reaction unit 250 performs an intervention based on an ECA rule. For example, assume the event specified for the ECA rule is the caller 10 identifying himself/herself as a family member and requesting the user 30 perform a money transfer because of an emergency situation (e.g., an accident). Assume the condition specified for the ECA rule is the user 30 is alone. Assume the set of actions specified for the ECA rule include recommending the user 30 place the caller 10 on hold, warning the user 30 the caller 10 is a potential scammer, and suggesting the user 30 perform at least one of the following steps: (1) text a trusted person (e.g., another family member) to confirm the emergency situation, (2) prompt the caller 10 with a verification question that the family member the caller 10 identified himself/herself as would know the answer to, and/or (3) transfer the caller 10 to another trusted person (e.g., if the user 30 is a senior, transfer to a daughter or a caregiver; if the user 30 is a teenager, transfer to a parent). Further, if the external monitoring unit 230 detected the user 30 performing a money transfer, the ECA reaction unit 250 may cause the transfer to freeze until the emergency situation and/or the caller 10 is verified. The ECA reaction unit 250 may provide a recommendation, a warning, and a suggestion to the user 30 via one or more sensor devices 150 (e.g., a MA device). The ECA reaction unit 250 may also enforce an action. For example, if the user 30 is a child or an elderly individual with dementia and the overall risk assessment metric is very high, the ECA reaction unit 250 may force a hang up of a phone call.

As another example, if the multi-sensory inputs collected matches a signature of a known scam, the ECA reaction unit 250 may instruct the user 30 to hang up, and may report the phone call/voice message automatically (e.g., report to a governmental agency, etc.).

The reporting unit 260 generates a report for the user 30, wherein the report comprises risk assessment results of a risk assessment performed for an intercepted phone call/voice message. The report indicates whether the phone call/voice message is classified as a scam. The report further indicates one or more of the following: (1) outgoing contact information (e.g., phone number, mail address, e-mail address, etc.) for responding to/returning the call/voice message, (2) an overall risk assessment metric for the phone call/voice message, (3) a recommendation for the user 30. In one embodiment, the phone call/voice message and the risk assessment results may be maintained in a database indexed by the outgoing contact information (e.g., maintained in the data set 370).

As stated above, one or more components of the system 200 (e.g., the voice and content analyzer 220, the external reporting unit 230, and/or context and risk assessment unit 240) may apply one or more learned models. In one embodiment, one or more learned models utilized by the system 200 are trained offline (i.e., not on the device 100). For example, in a training stage, the learned models may be trained on a remote server using machine learning. After training, the learned models may be loaded onto/downloaded to the device 100 as a portion of the system 200 for use in a deployment stage. In another embodiment, the learned models are trained on the device 100 itself.

In one embodiment, one or more components of the system 200 may reside in a cloud computing environment. In one embodiment, one or more components of the system 200 may reside on one or more server devices. In one embodiment, at least one component of the system 200 may reside in a cloud computing environment, and at least one other component of the system 200 may reside on at least one server device.

Let <ID, CF> generally denote a tuple representing an output of a learned model, wherein ID represents a predicted classification class, and CF represents an estimated confidence level for the predicted classification class.

Figure 3:
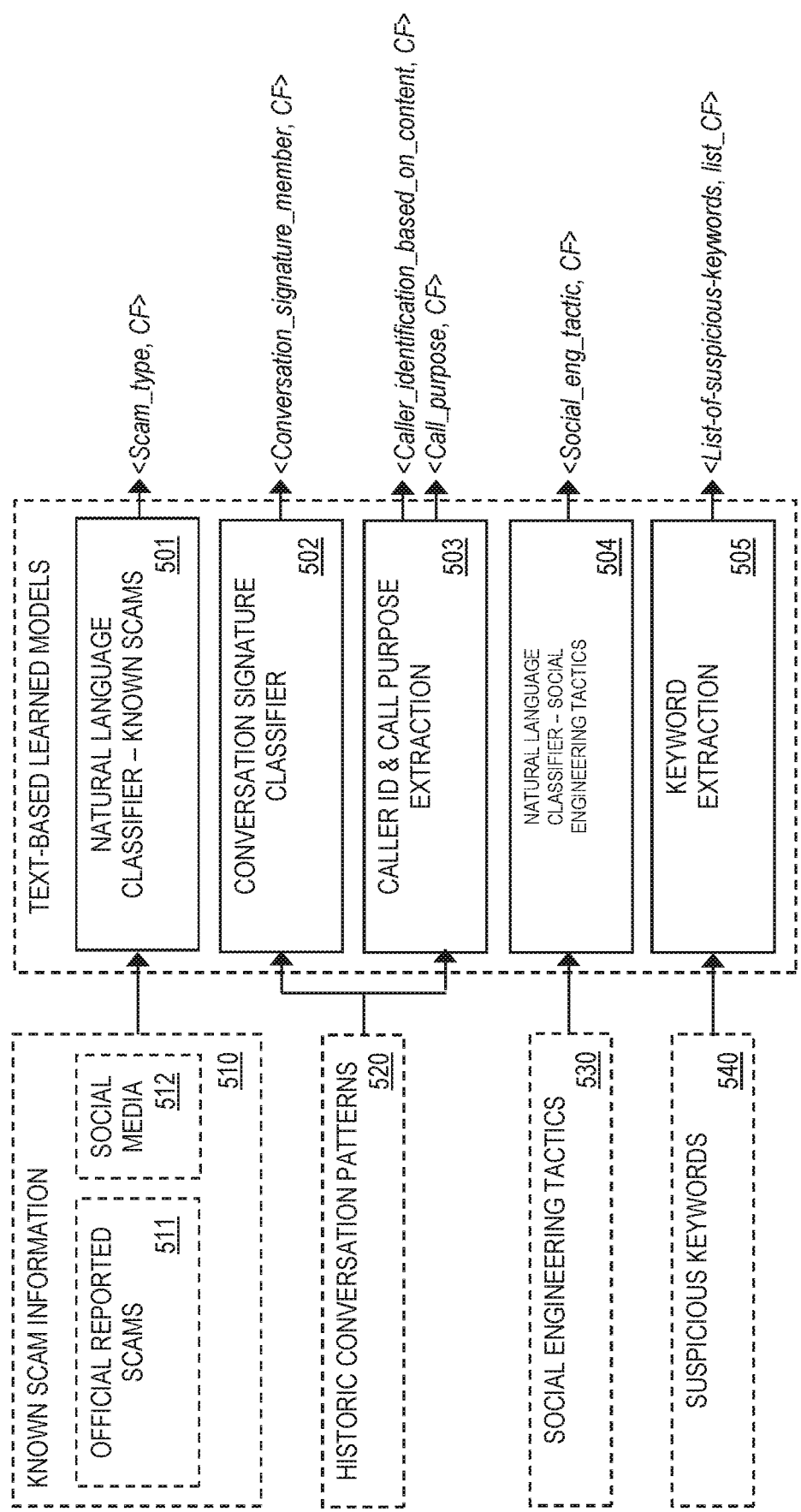
FIG. 3 illustrates one or more example text-based learned models utilized by the fraud and abuse prevention system, in accordance with an embodiment of the invention.

FIG. 3 illustrates one or more example text-based learned models utilized by the system 200, in accordance with an embodiment of the invention. In the training stage, a natural language classifier 501 is trained to detect phone scams and unwanted phone solicitations based on training data 510 comprising information indicative of signatures of existing/known phone scams and unwanted phone solicitations. The training data 510 includes, but is not limited to, a set 511 of official reported scams (e.g., scams reported to a governmental agency, etc.), and a set 512 of scams reported on social media platforms by social media users affected by the scams. In the deployment stage, the resulting learned classifier 501 may be applied by the voice and content analyzer 220 to output, for an intercepted phone call/voice message, a tuple <Scam_type, CF> representing a predicted/detected scam type. Examples of predicted classification classes for Scam_type include, but are not limited to, the following: none (i.e., the intercepted phone call/voice message does not match signatures of known scams), grandpa, tax (e.g., IRS), technical support (e.g., Microsoft® technical support scam), foreign (e.g., known scams perpetrated by foreign scammers), etc.

In the training stage, a conversation signature classifier 502 is trained to detect conversation signatures of trusted persons of the user 30 (e.g., trusted family members, etc.) based on training data 520 comprising historic conversation patterns of the trusted persons. The historic conversation patterns are indicative of idiosyncratic patterns in the trusted persons' style of speaking, e.g., word choice, utterance length, etc. In the deployment stage, the resulting learned classifier 502 may be applied by the voice and content analyzer 220 to output, for an intercepted phone call/voice message, a tuple <Conversation_signature_member, CF> representing a predicted/detected conversation signature of a trusted person that the caller 10 is most similar to. Examples of predicted classification classes for Conversation_signature_member include, but is not limited to, the following: unknown (i.e., the caller 10 does not match conversation signatures of any trusted persons), daughter, grandson, nurse, etc.

In the training stage, a caller identity and call purpose extraction model 503 is trained to detect caller identity and call purpose based on the training data 520. In the deployment stage, the resulting learned model 503 may be applied by the voice and content analyzer 220 to output, for an intercepted phone call/voice message, the following tuples: (1) <Caller_identification_based_on_content, CF> representing a predicted/detected identity of the caller 10 based on a transcript of the caller's speech, and (2)<Call_purpose, CF> representing a predicted/detected purpose of the phone call/voice message. Examples of predicted classification classes for Caller_identification_based_on_content include, but are not limited to, the following: unknown (i.e., no explicit or implicit introduction from the caller 10), daughter, grandson, nurse, etc. Examples of predicted classification classes for Call_purpose include, but are not limited to, the following: accident, etc.

In one embodiment, the caller identity and call purpose extraction model 503 is also trained to detect an entity type of the caller 10 (i.e., entity extraction). In another embodiment, a different model is trained to detect an entity of the caller 10 instead, such that the caller identity and call purpose extraction model 503 and the different model are utilized independently in the deployment stage.

In the training stage, a natural language classifier 504 is trained to detect social engineering tactics scammers may employ based on training data 530 comprising information relating to such social engineering tactics. In the deployment stage, the resulting learned classifier 504 may be applied by the voice and content analyzer 220 to output, for an intercepted phone call/voice message, a tuple <Social_eng_tactic, CF> representing a predicted/detected social engineering tactic the caller 10 has employed. Examples of predicted classification classes for Social_eng_tactic include, but is not limited to, the following: threatening, pressure, rushing, don't tell anyone, etc.

In the training stage, a keyword extraction model 505 is trained to detect suspicious keywords commonly associated with known scams based on training data 540 comprising information indicative of such suspicious keywords. In the deployment stage, the resulting learned model 505 may be applied by the voice and content analyzer 220 to output, for an intercepted phone call/voice message, a tuple <List-of-suspicious-keywords, list_CF> representing a list of suspicious keywords the caller 10 has used. Examples of predicted classification classes for List-of-suspicious-keywords include, but is not limited to, the following: PayPal®, payment, money transfer, money order, green dot card, social security number, etc.

In one embodiment, in the deployment stage, each classifier/model 501, 502, 503, and 504 receives, for an intercepted phone call/voice message, two different transcripts: (1) a transcript of the caller's speech resulting from isolating the caller's voice in a recording of the phone call/voice message and applying a speech-to-text service/process to the caller's voice to transcribe the caller's speech, and (2) a transcript of the user's speech resulting from isolating the user's voice in the recording and applying a speech-to-text service/process to the user's voice to transcribe the user's speech. The model 505 receives, for an intercepted phone call/voice message, a transcript of a conversation/speech resulting from applying a speech-to-text service/process to a recording of the phone call/voice message to transcribe the conversation/speech.

Figure 4:
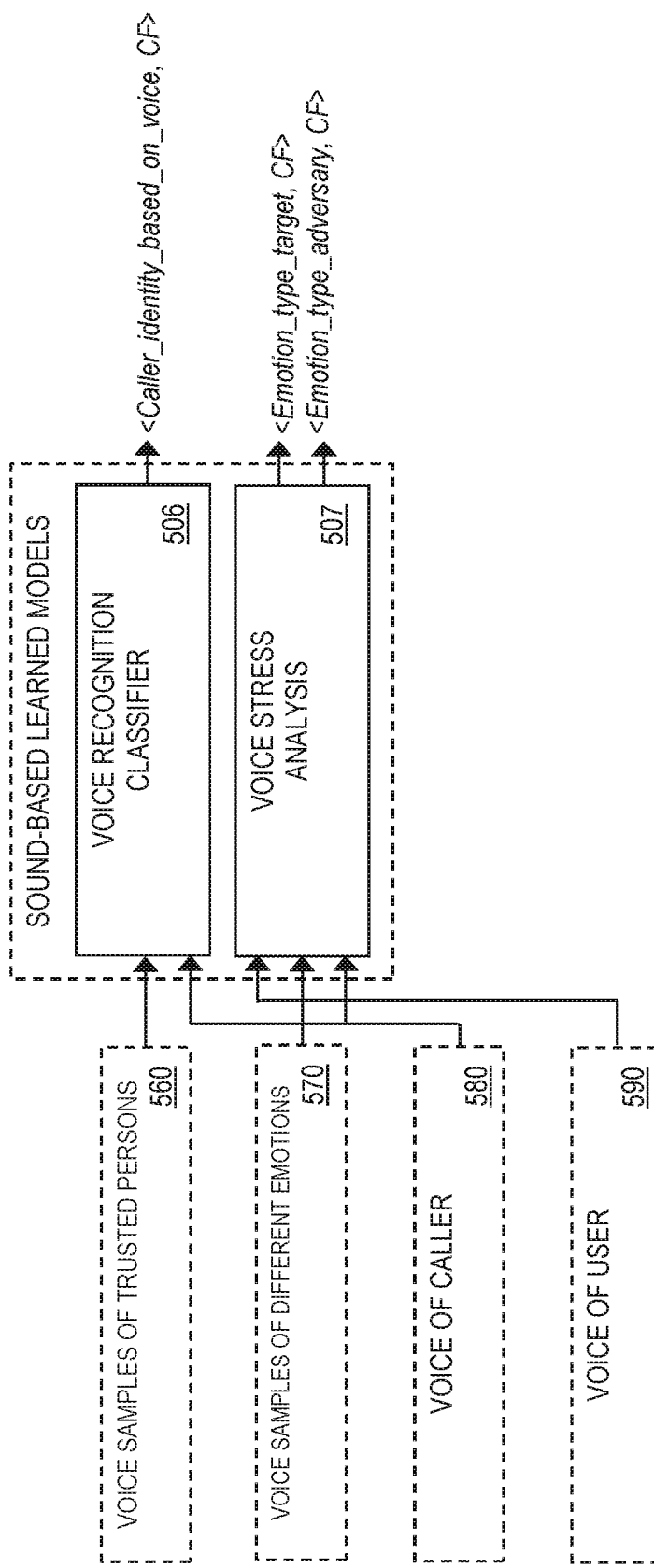
FIG. 4 illustrates one or more example sound-based learned models utilized by the fraud and abuse prevention system, in accordance with an embodiment of the invention.

FIG. 4 illustrates one or more example sound-based learned models utilized by the system 200, in accordance with an embodiment of the invention. In the training stage, a voice recognition classifier 506 is trained to detect voice patterns of trusted persons of the user 30 based on training data 560 comprising voice samples of the trusted persons. In the deployment stage, the resulting learned classifier 506 may be applied by the voice and content analyzer 220 to output, for an intercepted phone call/voice message, a tuple <Caller_identity_based_on_voice, CF> representing a predicted/detected identity of the caller 10 based on the caller's voice. Examples of predicted classification classes for Caller_identity_based_on_voice include, but are not limited to, the following: unknown (i.e., the caller 10 does not match conversation signatures of any trusted persons), daughter, grandson, nurse, etc.

In the training stage, a voice stress analysis model 507 is trained to detect emotional distress based on training data 570 comprising voice samples exhibiting different emotions. In the deployment stage, the resulting learned model 507 may be applied by the voice and content analyzer 220 to output, for an intercepted phone call/voice message, the following tuples: (1) <Emotion_type_adversary, CF> representing a predicted/detected emotion of the caller 10, and (2) <Emotion_type_target, CF> representing a predicted/detected emotion of the user 30. Examples of predicted classification classes for Emotion_type_adversary and Emotion_type_target include, but are not limited to, the following: scared, nervous, anger, sympathetic, worried, etc.

In one embodiment, in the deployment stage, the classifier 506 receives, for an intercepted phone call/voice message, a voice recording 580 of the caller's voice after the caller's voice is isolated. The classifier 507 receives, for an intercepted phone call/voice message, two different voice recordings: (1) a voice recording 580 of the caller's voice resulting from isolating the caller's voice in a recording of the phone call/voice message, and (2) a voice recording 590 of the user's voice resulting from isolating the user's voice in the recording of the phone call/voice message.

Figure 5:
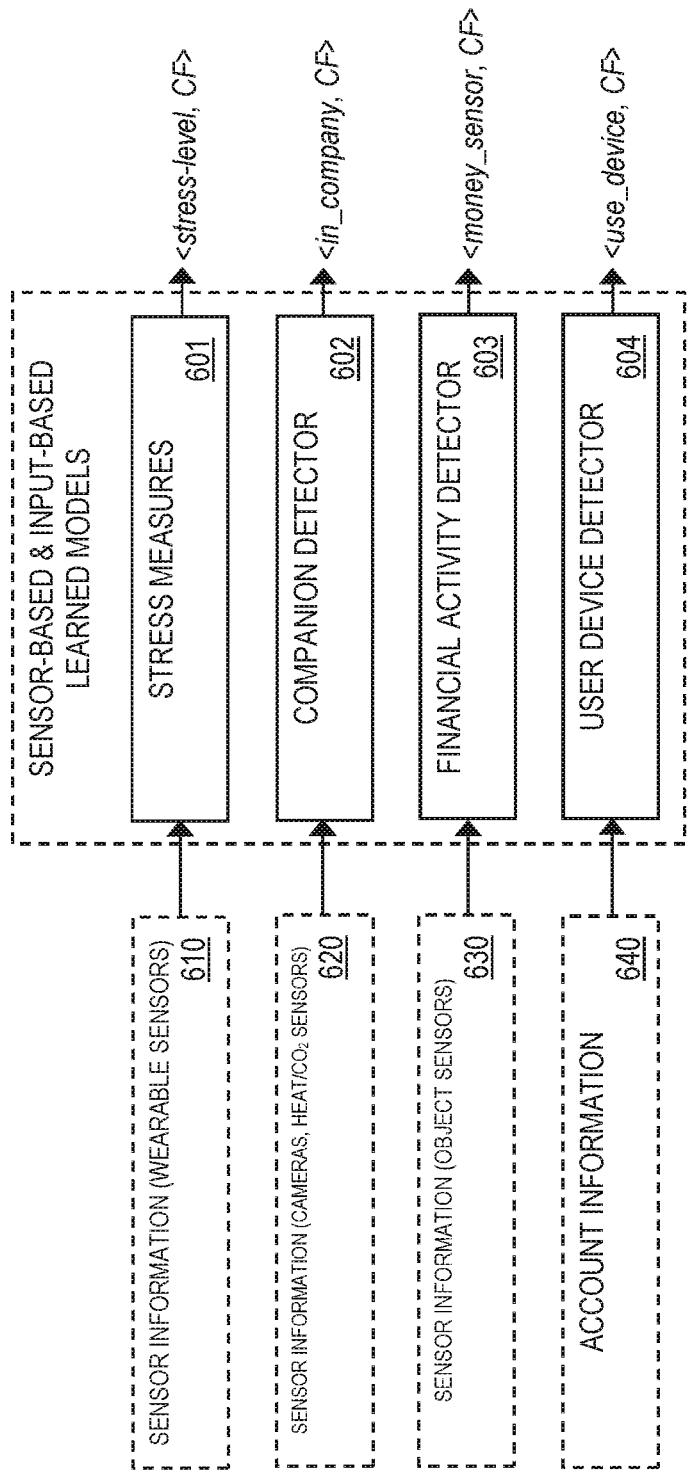
FIG. 5 illustrates one or more example sensor-based and input-based learned models utilized by the fraud and abuse prevention system, in accordance with an embodiment of the invention.

FIG. 5 illustrates one or more example sensor-based and input-based learned models utilized by the system 200, in accordance with an embodiment of the invention. In the training stage, a stress measures model 601 is trained to detect stress levels of the user 30 based on training data 610 comprising sensor information from one or more IoT sensor devices 150 (e.g., sensor information from wearable sensor devices, such as corporal sensor devices that monitor body temperature, sweat, heartbeat, blood pressure, and other biometric measures). In the deployment stage, the resulting learned model 601 may be applied by the external monitoring unit 230 to output, for an intercepted phone call/voice message, a tuple <stress-level, CF> representing predicted/detected stress levels of the user 30. Examples of predicted classification classes for stress-level include, but is not limited to, the following: standard, high, medium, low, etc.

In the training stage, a companion detector model 602 is trained to detect whether the user 30 is alone or is with one or more companions based on training data 620 comprising sensor information from one or more IoT sensor devices 150 (e.g., sensor information from video cameras, heat sensors, and/or $CO_2$ sensors arranged in the home/house of the user 30). In the deployment stage, the resulting learned model 602 may be applied by the external monitoring unit 230 to output, for an intercepted phone call/voice message, a tuple <in_company, CF> representing a predicted/detected determination of whether the user 30 is alone or with one or more companions. Examples of predicted classification classes for in_company include, but is not limited to, the following: alone, with someone, etc.

In the training stage, a financial activity detector model 603 is trained to detect when a financial related activity is performed (e.g., a money holder of the user 30 is opened and cash/a credit card is taken out) based on training data 630 comprising sensor information from one or more IoT sensor devices 150 deployed in an object of the user 30 (e.g., sensor information from sensor devices deployed in a money holder, a user device 160, etc.). In the deployment stage, the resulting learned model 603 may be applied by the external monitoring unit 230 to output, for an intercepted phone call/voice message, a tuple <money_sensor, CF> representing a predicted/detected determination of whether the a financial activity has been performed. Examples of predicted classification classes for money_sensor include, but is not limited to, the following: opened account computer, opened wallet, no action, etc.

In the training stage, a user device detector model 604 is trained to detect when the user 30 utilizes a user device 160 to perform an action commonly requested by scammers (e.g., money transfer, etc.) based on training data 640 comprising inputs from one or more user devices 160 and/or one or more external data sources 170 (e.g., sensor information from sensor devices deployed in a money holder, a user device 160, etc.). In the deployment stage, the resulting learned model 604 may be applied by the external monitoring unit 230 to output, for an intercepted phone call/voice message, a tuple <use_device, CF> representing a predicted/detected determination of whether the user 30 has opened his/her user device 160. Examples of predicted classification classes for use_device include, but is not limited to, the following: opened device, no action (i.e., no device in use), etc.

FIG. 6 illustrates an example process for determining an overall risk assessment metric for an intercepted phone call/voice message, in accordance with an embodiment of the invention. In one embodiment, the context and risk assessment unit 240 determines an overall risk assessment metric for an intercepted phone call/voice message by applying a risk function using multi-sensory inputs and previously learned signatures as input.

Let T denote a set of tuples representing all outputs of different learned models (i.e., text-based, sound-based, sensor-based and/or input-based learned models) utilized by one or more components of the system 200. In one embodiment, the set T is ordered into different indication groups. Let $G_i$ generally denote an indication group comprising one or more of tuples of a particular type, wherein $0 \leq i \leq n$. Let τ denote a threshold for determining whether a predicted classification class is reliable, wherein $0 \leq \tau \leq 1$.

In one embodiment, the system 200 may order the outputs into the following types of indication groups: (1) a first indication group $G_1$ relating to an identity of the caller 10 ("caller identity"), (2) a second indication group $G_2$ relating to a type of scam ("scam type"), (3) a third indication group $G_3$ relating to a purpose of an intercepted phone call/voice message ("call purpose"), and (4) a fourth indication group $G_4$ relating to context. The first indication group $G_1$ relating to caller identity comprises, but is not limited to, the following tuples: <Caller_identification_based_on_content, CF>, <Conversation_signature_member, CF>, and <Caller_identity_based_on_voice, CF>. The second indication group $G_2$ relating to scam type comprises, but is not limited to, the following tuples: <Scam_type, CF>, <Social_eng_tactic, CF>, <Emotion_type_adversary, CF>, <List-of-suspicious-keywords, list_CF>, and <Emotion_type_target, CF>. The third indication group $G_3$ relating to call purpose comprises, but is not limited to, the following tuples: <Call_purpose, CF>. The fourth indication group $G_4$ relating to context comprises, but is not limited to, the following tuples: <stress-level, CF>, <in_company, CF>, <money_sensor, CF>, <use_device, CF>.

Let t generally denote a tuple, wherein $t \in T$, $t=$<ID, CF>, and $CF \leq \tau$. In one embodiment, when $CF \leq \tau$ (e.g., when no reliable conclusion was reached), ID of a tuple t is replaced with $\perp$ resulting in a modified tuple $t'=$<$\perp$, 1>.

In one embodiment, a predicted classification class ID with a low confidence level CF may be removed (i.e., the predicted classification class ID is ignored in determining the overall risk assessment metric).

Let weight $w_i$ represent a corresponding weight for an indication group $G_i$ showing an overall importance of the indication group $G_i$. Let $f_i(G_i)$ represent a corresponding function for an indication group $G_i$ that integrates predicted classification classes output by learned models utilized for the indication group $G_i$, and returns an estimated risk value for the indication group $G_i$, wherein $f_i(G_i) \to (0, 1)$ (i.e., the risk value may be between 0 (indicating no risk) and 1 (indicating high risk)). An overall risk assessment metric for an intercepted phone call/voice message may be represented in accordance with equation (1) provided below:

$$\text{risk} = \sum_{i=0}^{n} f_i(G_i) * w_i. \quad (1)$$

In one embodiment, the system 200 applies entropy to account for any discrepancies between outputs of different learned models utilized for the indication group $G_1$. For example, the function $f_1(G_1)$ for the indication group $G_1$ may be represented in accordance with equations (2.1)-(2.2) provided below:

$$C=\{ID | <ID, CF> \in G_1\} \quad (2.1), \text{ and}$$

$$f_1(G_1) = \text{Entropy}(C) \quad (2.2),$$

wherein $f_1(G_1)=0$ if all learned models utilized for the indication group $G_1$ output the same predicted classification class, and $f_1(G_1)=1$ if the learned models output different predicted classification classes.

In another embodiment, the risk assessment may be performed using a Bayesian network to integrate all variables. The Bayesian network may be constructed from data or by a domain expert.

In yet another embodiment, a classifier or a neural network may be trained to incorporate all classification results.

For example, for an intercepted phone call, assume the voice and content analyzer 220 applied text-based learned models that output predicted classification classes indicating the following: the caller 10 identified himself/herself as a family member, requested the user 30 for money, and further requested the user 30 not tell anyone. Further, assume the voice and content analyzer 220 applied sound-based learned models that output predicted classification classes indicating the following: emotional distress is detected in the caller's voice, and the caller's voice does not match any voice samples of trusted persons. Further, assume the external monitoring unit 230 applied sensor-based and/or input-based learned models that output predicted classification classes indicating the following: the user 30 opened a user device 160 to access a website for money transfers (e.g., PayPal®). Based on the predicted classification classes, the context and risk assessment unit 240 may determine that an overall risk assessment metric for the phone call is high.

For example, assume an ECA rule specified as the following tuple: <risk=0.8, open_wallet && alone, hangup_phone>, wherein the event is an overall risk assessment metric of 0.8, the condition is the user 30 is alone and opened his/her wallet, and the set of actions is recommending the user 30 hang up the phone. For an intercepted phone call, assume the external monitoring unit 230 applied sensor-based and/or input-based learned models that output predicted classification classes indicating the following: the user 30 is alone, and the user 30 opened his/her wallet. Further, assume the context and risk assessment unit 240 determines that an overall risk assessment metric for the phone call is 0.8. As the predicted classification classes and the overall risk assessment metric matches the event and condition specified, the ECA reaction unit 250 may recommend, based on the set of actions specified, the user 30 hang up on the caller 10.

For example, assume another ECA rule specified as the following tuple: <risk=0.8, open_wallet && ! alone, place_call_on_hold && inform_companion>, wherein the event is an overall risk assessment metric of 0.8, the condition is the user 30 is not alone and opened his/her wallet, and the action is recommending the user 30 place the phone call on hold and inform a companion. For an intercepted phone call, assume the external monitoring unit 230 applied sensor-based and/or input-based learned models that output predicted classification classes indicating the following: the user 30 is not alone, and the user 30 opened his/her wallet. Further, assume the context and risk assessment unit 240 determines that an overall risk assessment metric for the phone call is 0.8. As the predicted classification classes and the overall risk assessment metric matches the event and condition specified, the ECA reaction unit 250 may recommend, based on the set of actions specified, the user 30 place the caller 10 on hold and inform his/her companion.

In one embodiment, the system 200 may be utilized for continuous prevention of other types of abuses, such as elder abuse, child abuse, etc. For example, the system 200 may be employed for detecting occurrence of elder abuse. A MA device (e.g., a walking cane) continuously listens to surrounding noises and conversations of a senior. One or more wearable sensor devices carried by the senior captures biometric measures of the senior. One or more sensor devices deployed in an object of the senior detects when a financial related activity is performed (e.g., a money holder of the senior is opened and cash/credit card is taken out). The system 200 is configured to detect an abusive incident between an adversary (e.g., a caregiver, an abusive child, etc.) and the senior based on the information collected from the MA device, the wearable sensor devices, and/or the sensor devices deployed in the object of the senior. An abusive incident involves the adversary interacting with the senior in an abusive manner (e.g., shouting at the senior, physically assaulting the senior, coercing the senior into giving money, etc.). For example, sensor information captured by the wearable sensor devices may indicate that the senior is frightened and/or stressed. As another example, a recording captured by the MA device may indicate that the adversary is shouting at the senior (i.e., high loudness levels). As another example, sensor information captured by the sensor devices deployed in a money holder of the senior may indicate that cash/a credit card was taken out of the money holder. If an abusive incident is detected, the system 200 may report the abusive incident to a trusted person or entity (e.g., a trusted family member, a social service representative, the police, etc.).

As another example, the system 200 may be employed for detecting occurrence of child abuse. A MA device (e.g., a doll, a baby monitor, etc.) continuously listens to surrounding noises and conversations of child. One or more wearable sensor devices carried by the child captures biometric measures of the child. The system 200 is configured to detect an abusive incident between an adversary (e.g., a nanny, an abusive parent, etc.) and the child based on the information collected from the MA device and the wearable sensor devices. An abusive incident involves the adversary interacting with the child in an abusive manner (e.g., shouting at the child, physically assaulting the child, etc.). For example, sensor information captured by the wearable sensor devices may indicate that the child is frightened and/or stressed. As another example, a recording captured by the MA device may indicate that the adversary is shouting at the child (i.e., high loudness levels). If an abusive incident is detected, the system 200 may report the abusive incident to a trusted person or entity (e.g., a trusted family member, a social service representative, the police, etc.).

Figure 7:
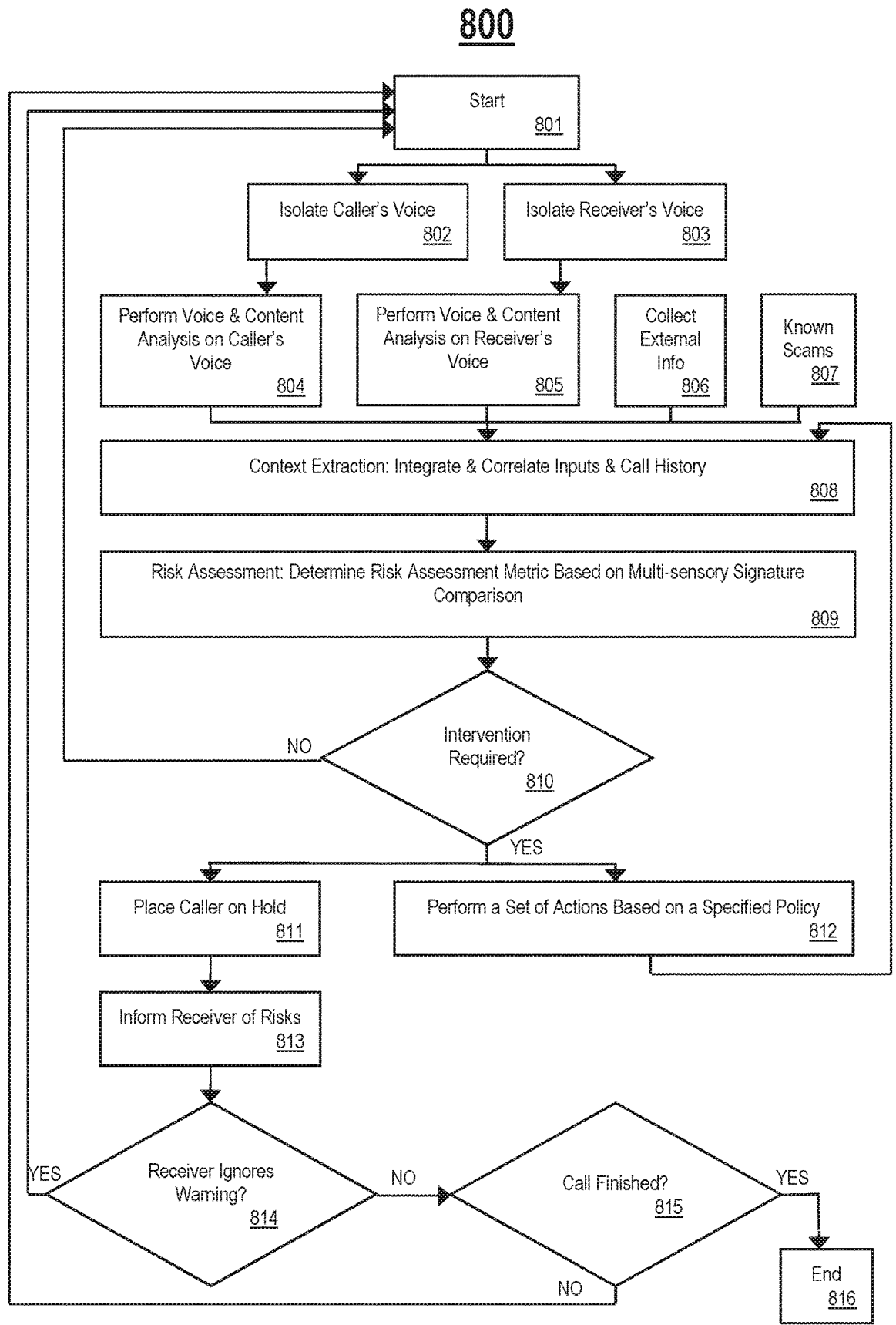
FIG. 7 is a flowchart for an example process for determining an overall risk assessment metric for an intercepted phone call between a caller and a receiver, in accordance with an embodiment of the invention.

FIG. 7 is a flowchart for an example process 800 for determining an overall risk assessment metric for an intercepted phone call between a caller and a receiver, in accordance with an embodiment of the invention. In process block 801, process 800 starts. In process block 802, isolate caller's voice. In process block 803, isolate receiver's voice.

In process block 804, perform voice and content analysis on the caller's voice. In process block 805, perform voice and content analysis on the receiver's voice. In process block 806, collect external information (e.g., sensor information and/or inputs from IoT sensor devices, user devices, external data sources, etc.). In process block 807, obtain information comprising signatures of known scams.

In process block 808, perform context extraction to integrate and correlate inputs and call history, if available.

In process block 809, perform risk assessment to determine an overall risk assessment metric for the phone call based on multi-sensory signature comparison.

In process block 810, determine if an intervention is required. If an intervention is required, proceed to process blocks 811 and 812. If an intervention is not required, return to process block 801.

In process block 811, place caller on hold. In process block 812, perform a set of actions based on a specified policy (e.g., ECA rules), and return to process block 808.

In process block 813, inform receiver of risks.

In process block 814, determine whether the receiver ignores warning of the risks. If the receiver ignores warning of the risks, return to process block 801. If the receiver does not ignore warning of the risks, proceed to process block 815.

In process block 815, determine whether the phone call between the caller and the receiver has finished. If the phone call has finished, proceed to process block 816 where the process 800 ends. If the phone call has not finished, return to process block 801.

In one embodiment, process blocks 801-816 are performed by one or more components of the system 200, such as the gate keeper 210, the voice and content analyzer 220, the external monitoring unit 230, the context and risk assessment unit 240, the ECA reaction unit 250, and the reporting unit 260.

Figure 8:
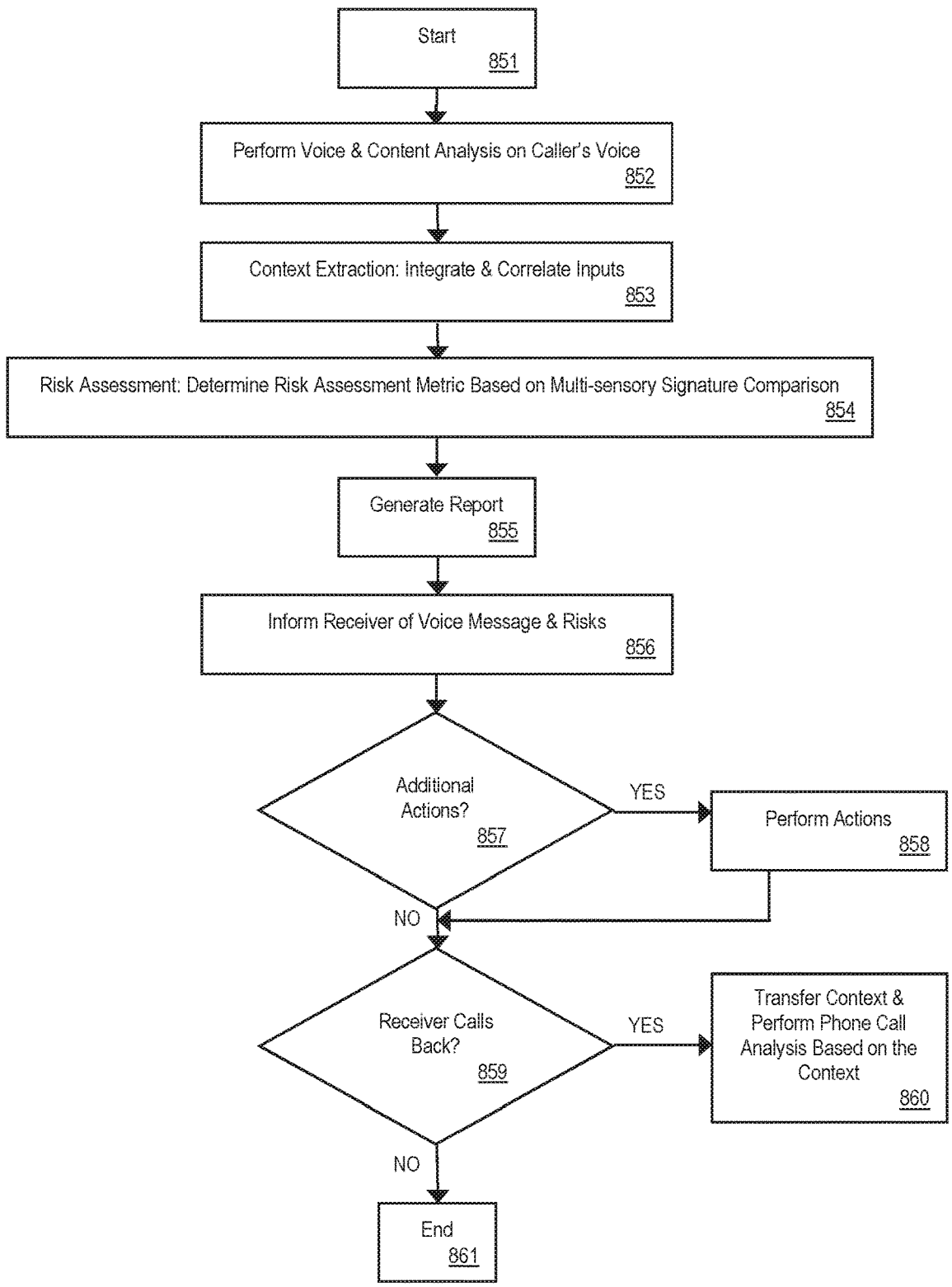
FIG. 8 is a flowchart for an example process for determining an overall risk assessment metric for an intercepted voice message left by a caller for a receiver, in accordance with an embodiment of the invention.

FIG. 8 is a flowchart for an example process 850 for determining an overall risk assessment metric for an intercepted voice message left by a caller for a receiver, in accordance with an embodiment of the invention. In process block 851, process 850 starts. In process block 852, perform voice and content analysis on caller's voice.

In process block 853, perform context extraction to integrate and correlate inputs. In process block 854, perform risk assessment to determine an overall risk assessment metric for the voice message based on multi-sensory signature comparison.

In process block 855, generate report. In process block 856, inform the receiver of the voice message and risks.

In process block 857, determine whether additional actions are required. If additional actions are required, proceed to process block 858. If additional actions are not required, proceed to process block 859.

In process block 858, perform the additional actions.

In process block 859, determine whether the receiver calls back the caller. If the receiver calls back the caller, proceed to process block 860. If the receiver does not call back the caller, proceed to process block 861.

In process block 860, transfer context and perform an analysis of the phone call between the receiver and the caller based on the context (e.g., perform process 800 described above).

In process block 861, the process 850 ends.

In one embodiment, process blocks 851-861 are performed by one or more components of the system 200, such as the gate keeper 210, the voice and content analyzer 220, the external monitoring unit 230, the context and risk assessment unit 240, the ECA reaction unit 250, and the reporting unit 260.

Figure 9:
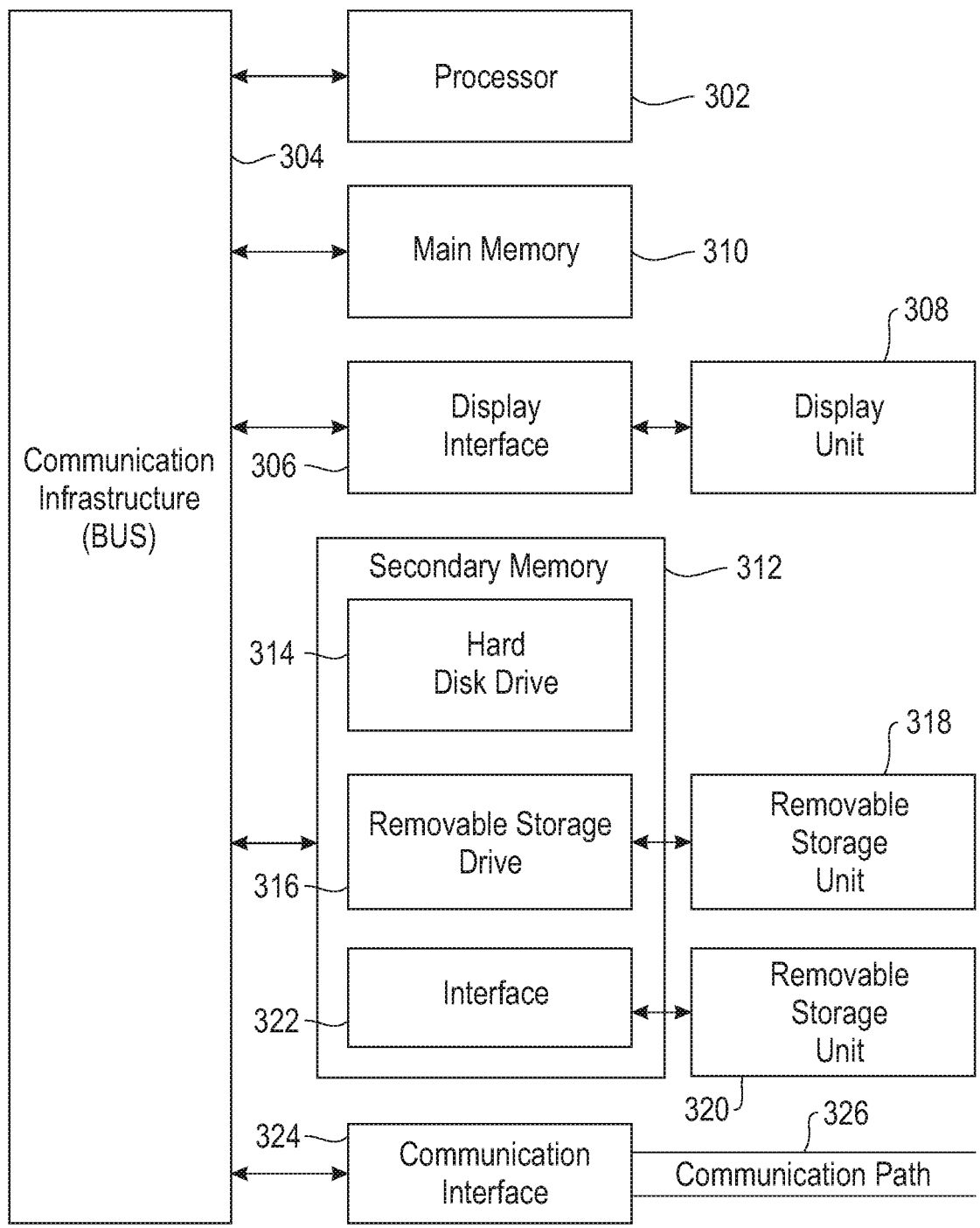
FIG. 9 is a high level block diagram showing an information processing system useful for implementing an embodiment of the present invention.

FIG. 9 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    intercepting a voice communication from a caller to a callee;
    collecting multi-sensory inputs associated with the voice communication by capturing data via at least one sensor device, applying at least one learned classifier to the captured data, and aggregating one or more classification results from the at least one learned classifier as the multi-sensory inputs, wherein the captured data comprises at least one biometric measure of the callee, and the multi-sensory inputs are indicative of content of the voice communication, at least one action carried out by the callee in response to the content of the voice communication, and a stress level of the callee in response to the content of the voice communication; and
    determining an overall risk assessment metric for the voice communication based on the multi-sensory inputs and learned signatures, wherein the overall risk assessment metric indicates a likelihood the voice communication is a scam.

2. The method of claim 1, wherein the voice communication is one of a phone call or a voice message.

3. The method of claim 1, wherein the learned signatures comprises at least one of: a signature of a known scam, and a conversation signature of a trusted person of the callee.

4. The method of claim 1, further comprising:
    determining whether an intervention is necessary based on the overall risk assessment metric, the multi-sensory inputs, and a set of rules, wherein each rule specifies an event, a condition to satisfy if the event occurs, and a set of actions to perform if the condition is satisfied; and
    in response to determining an intervention is necessary, performing at least one of the following: providing a recommendation to the callee, providing a warning to the callee, providing a suggestion to the callee, or enforcing an action.

5. The method of claim 1, wherein the captured data comprises a recording of the voice communication captured by the at least one sensor device configured to continuously listen to, and initiate a recording of, one or more surrounding noises and a conversation of the callee.

6. The method of claim 5, wherein collecting multi-sensory inputs associated with the voice communication further comprises:
    obtaining a transcript of a conversation or speech included in the recording by transcribing the conversation or speech using a speech-to-text process; and
    applying one or more text-based learned models of the at least one learned classifier to the transcript to obtain the one or more classification results, wherein the one or more classification results comprise one or more predicted classification classes and one or more corresponding confidence levels, and the overall risk assessment metric is based on the one or more predicted classification classes and the one or more corresponding confidence levels.

7. The method of claim 6, wherein the one or more predicted classification classes comprise at least one of the following: a predicted scam type, a predicted conversation signature of a trusted person of the callee, a predicted caller identity of the caller, a predicted call purpose, a predicted social engineering tactic, and a list of suspicious keywords.

8. The method of claim 5, wherein collecting multi-sensory inputs associated with the voice communication further comprises:
applying one or more sound-based learned models of the at least one learned classifier to the recording to obtain the one or more classification results, wherein the one or more classification results comprise one or more predicted classification classes and one or more corresponding confidence levels, and the overall risk assessment metric is based on the one or more predicted classification classes and the one or more corresponding confidence levels.

9. The method of claim 8, wherein the one or more predicted classification classes comprise at least one of the following: a predicted caller identity of the caller, a predicted emotion of the callee, and a predicted emotion of an adversary.

10. The method of claim 1, wherein the at least one sensor device comprises at least one of the following: one or more wearable corporal sensor devices configured to capture the at least one biometric measure of the callee, and one or more other sensor devices deployed in an object of the callee to detect the at least one action carried out by the callee.

11. The method of claim 1, wherein the at least one action carried out by the callee comprises at least one of: the callee using a user device to complete a financial transaction, the callee looking up personal information, the callee providing the caller with remote access to the user device, and the callee removing an object to carry out a financial related activity.

12. A system comprising:
at least one processor; and
a non-transitory processor-readable memory device storing instructions that when executed by the at least one processor causes the at least one processor to perform operations including:
intercepting a voice communication from a caller to a callee;
collecting multi-sensory inputs associated with the voice communication by capturing data via at least one sensor device, applying at least one learned classifier to the captured data, and aggregating one or more classification results from the at least one learned classifier as the multi-sensory inputs, wherein the captured data comprises at least one biometric measure of the callee, and the multi-sensory inputs are indicative of content of the voice communication, at least one action carried out by the callee in response to the content of the voice communication, and a stress level of the callee in response to the content of the voice communication; and
determining an overall risk assessment metric for the voice communication based on the multi-sensory inputs and learned signatures, wherein the overall risk assessment metric indicates a likelihood the voice communication is a scam.

13. The system of claim 12, wherein the learned signatures comprises at least one of: a signature of a known scam, and a conversation signature of a trusted person of the callee.

14. The system of claim 12, the operations further comprising:
determining whether an intervention is necessary based on the overall risk assessment metric, the multi-sensory inputs, and a set of rules, wherein each rule specifies an event, a condition to satisfy if the event occurs, and a set of actions to perform if the condition is satisfied; and
in response to determining an intervention is necessary, performing at least one of the following: providing a recommendation to the callee, providing a warning to the callee, providing a suggestion to the callee, or enforcing an action.

15. The system of claim 12, wherein the captured data comprises a recording of the voice communication captured by the at least one sensor device configured to continuously listen to, and initiate a recording of, one or more surrounding noises and a conversation of the callee.

16. The system of claim 15, wherein collecting multi-sensory inputs associated with the voice communication further comprises:
obtaining a transcript of a conversation or speech included in the recording by transcribing the conversation or speech using a speech-to-text process; and
applying one or more text-based learned models of the at least one learned classifier to the transcript to obtain the one or more classification results, wherein the one or more classification results comprise one or more predicted classification classes and one or more corresponding confidence levels, the overall risk assessment metric is based on the one or more predicted classification classes and the one or more corresponding confidence levels, and the one or more predicted classification classes comprise at least one of the following: a predicted scam type, a predicted conversation signature of a trusted person of the callee, a predicted caller identity of the caller, a predicted call purpose, a predicted social engineering tactic, and a list of suspicious keywords.

17. The system of claim 15, wherein collecting multi-sensory inputs associated with the voice communication further comprises:
applying one or more sound-based learned models of the at least one learned classifier to the recording to obtain the one or more classification results, wherein the one or more classification results comprise one or more predicted classification classes and one or more corresponding confidence levels, the overall risk assessment metric is based on the one or more predicted classification classes and the one or more corresponding confidence levels, and the one or more predicted classification classes comprise at least one of the following: a predicted caller identity of the caller, a predicted emotion of the callee, and a predicted emotion of an adversary.

18. The system of claim 12, wherein the at least one sensor device comprises at least one of the following: one or more wearable corporal sensor devices configured to capture the at least one biometric measure of the callee, and one or more other sensor devices deployed in an object of the callee to detect the at least one action carried out by the callee.

19. The system of claim 18, wherein the one or more classification results comprise one or more predicted classification classes and one or more corresponding confidence levels, and the overall risk assessment metric is based on the one or more predicted classification classes and the one or more corresponding confidence levels.

20. A computer program product comprising a computer-readable hardware storage medium having program code embodied therewith, the program code being executable by a computer to implement a method comprising:

intercepting a voice communication from a caller to a callee;

collecting multi-sensory inputs associated with the voice communication by capturing data via at least one sensor device, applying at least one learned classifier to the captured data, and aggregating one or more classification results from the at least one learned classifier as the multi-sensory inputs, wherein the captured data comprises at least one biometric measure of the callee, and the multi-sensory inputs are indicative of content of the voice communication, at least one action carried out by the callee in response to the content of the voice communication, and a stress level of the callee in response to the content of the voice communication; and determining an overall risk assessment metric for the voice communication based on the multi-sensory inputs and learned signatures, wherein the overall risk assessment metric indicates a likelihood the voice communication is a scam.

* * * * *